United States Patent [19]

Wang et al.

[11] Patent Number: 5,495,767
[45] Date of Patent: Mar. 5, 1996

[54] LASER VIBROMETER

[75] Inventors: Xingwu Wang, Alfred; James C. Simpson, Alfred Station, both of N.Y.

[73] Assignee: Alfred University, Alfred, N.Y.

[21] Appl. No.: 280,847

[22] Filed: Jul. 26, 1994

[51] Int. Cl.[6] .................................................. G01B 9/02
[52] U.S. Cl. .............................. 73/657; 356/358; 73/655
[58] Field of Search ...................... 73/655, 657; 356/345, 356/357, 358, 432 T

[56] References Cited

U.S. PATENT DOCUMENTS

| 3,573,805 | 4/1971 | Kelling | 356/363 |
| 3,715,562 | 2/1973 | Dendy et al. | 356/350 |
| 4,165,183 | 8/1979 | Hall et al. | 356/346 |
| 4,571,083 | 2/1986 | Büchner | 356/358 |
| 5,270,790 | 12/1993 | Matsumura | 356/346 |

FOREIGN PATENT DOCUMENTS

| 5440657 | 3/1979 | Japan | 356/357 |
| 4013905 | 1/1992 | Japan | 356/358 |

*Primary Examiner*—Hezron E. Williams
*Assistant Examiner*—Nashmiya Ashraf
*Attorney, Agent, or Firm*—Howard J. Greenwald

[57] ABSTRACT

A laser vibrometer which includes a laser, a laser beam splitter, two reflectors, an optical processor which includes two optical sensors, a digitizer for converting an analog signal into a digital signal, a flip-flop circuit, and a counter.

9 Claims, 5 Drawing Sheets

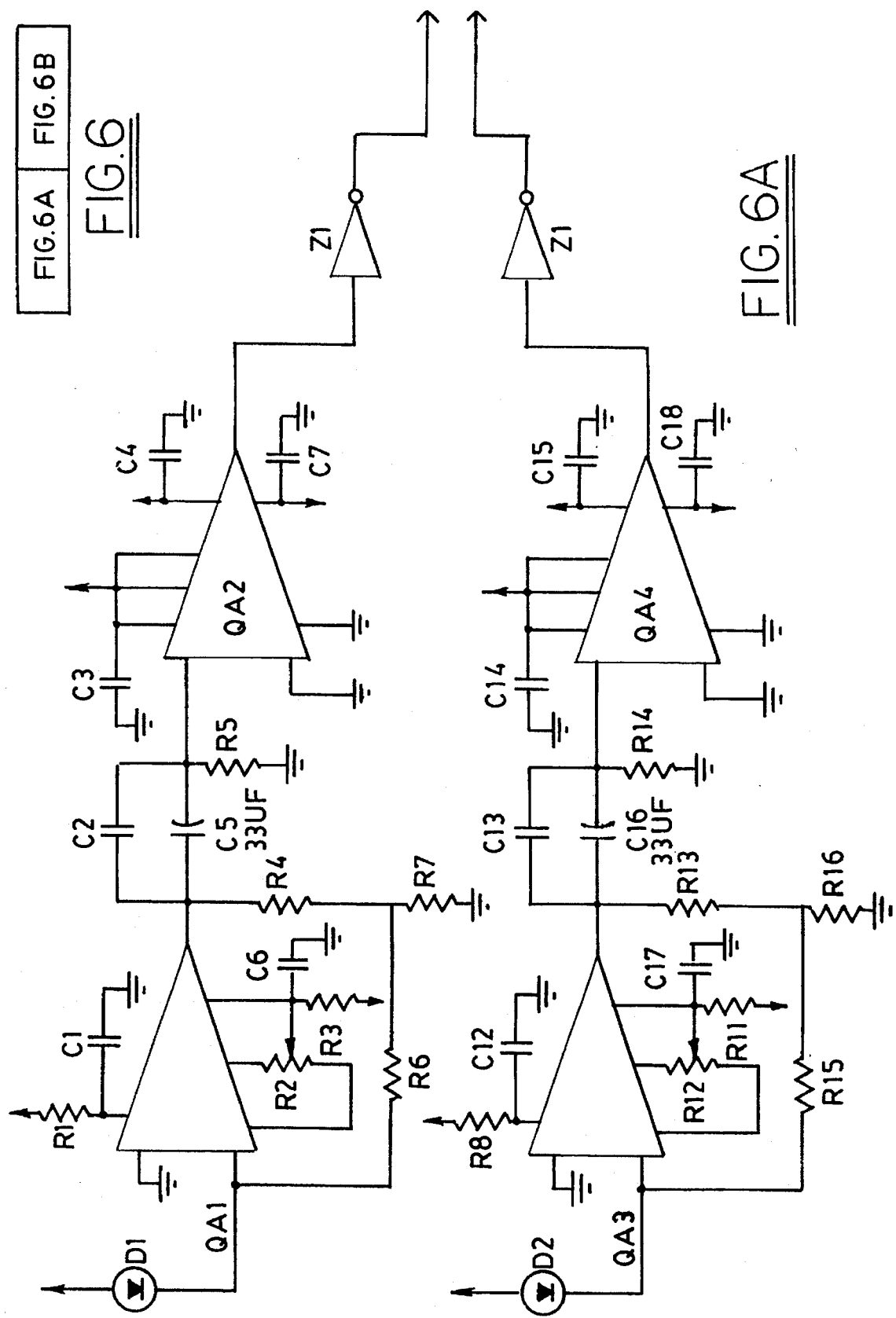

LASER VIBROMETER

FIELD OF THE INVENTION

A device for measuring vibration which utilizes laser rays and a signal processor.

BACKGROUND OF THE INVENTION

U.S. Pat. No. 5,159,406 discloses a laser-based accelerometer system which uses small motion induced shifts in frequency to measure the motion of an object. The detection system of this patent is complicated, expensive to manufacture, and difficult to use.

It is an object of this invention to provide a laser vibrometer which is substantially less expensive and easier to use than the system of U.S. Pat. No. 5,159,406.

SUMMARY OF THE INVENTION

In accordance with this invention, there is provided a laser vibrometer comprised of a means for producing a laser beam, means for splitting the laser beam into two separate beams, a first reflector, a second reflector, and means for collecting the reflected beams and digitally processing them.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIGS. 6A and 6B are a schematic diagram of one preferred laser vibrometer of this invention.

DESCRIPTION OF THE PREFERRED EMBODIMENT

Figure 1:
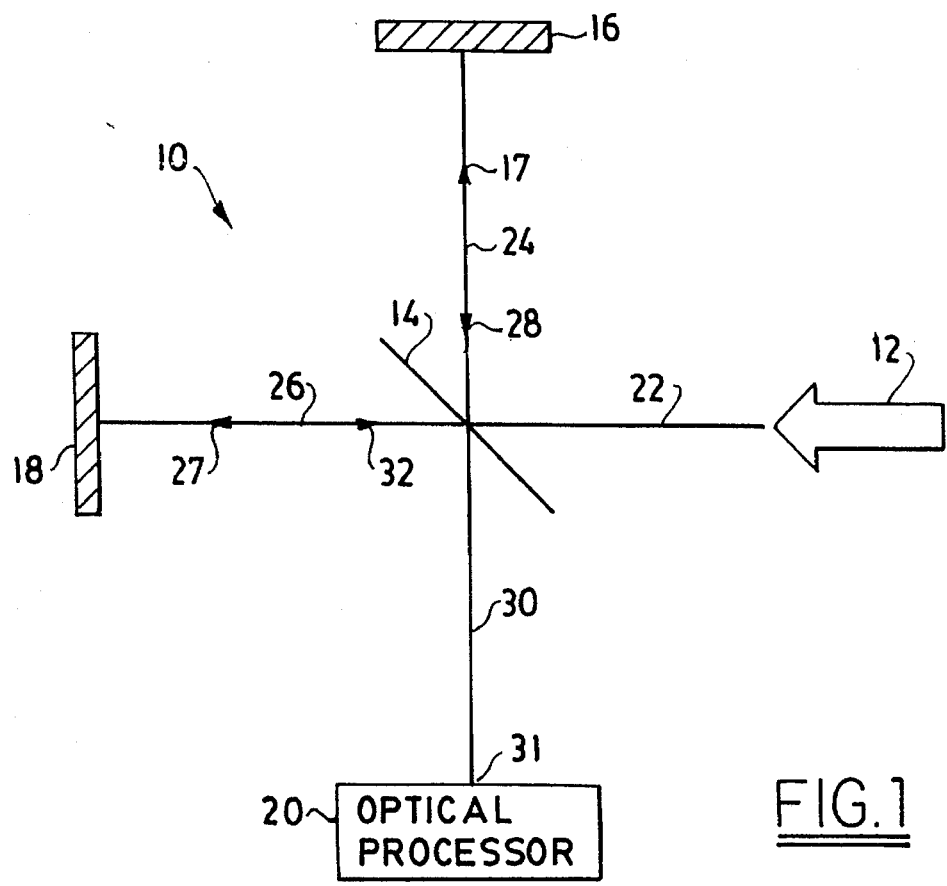
FIG. 1 is a schematic of a preferred laser vibrometer of this invention.

FIG. 1 is a schematic diagram of one preferred laser vibrometer 10. Referring to FIG. 1, it will be seen that laser vibrometer 10 is comprised of a means 12 for producing a laser beam, a laser beam splitter 14, a first reflector 16, a second reflector 18, and a digital signal processor 20.

Referring to FIG. 1, it will be seen that laser 12 produces a laser beam 22. Any conventional laser adapted to produce a coherent laser beam may be used as laser 12. Thus, referring to the Melles Griot "Optics Guide 5" (published by Melles Griot of 1770 Kettering Street, Irvine, Calif. in 1990), a helium neon laser (see pages 17–1 to 17–38) such as, e.g., a diode laser (see pages 20–1 to 20–72), and the like. In one preferred embodiment, a self-contained red helium-neon laser sold as catalog number 05 LLP 805 (see page 17–26 of the Melles Griot catalog) is used.

Referring again to FIG. 1, a beam splitter 14 is disposed in the path of laser beam 22. In general, beam splitter 14 may be located from about 1 to about 1,000 centimeters from laser 12; it is preferred, however, that beam splitter 14 be located from about 5 to about 50 centimeters from laser 12.

The function of beam splitter 14 is to reflect a first portion 24 of beam 22 towards reflector 16 in the direction of arrow 17 while simultaneously transmitting a second portion 26 of beam 22 towards reflector 18 in the direction of arrow 27.

Beam splitters are well known to those skilled in the art and are readily commercially available. Thus, referring to the aforementioned Melles--Griot catalog, one may use plate beam splitters (see pages 13–4 to 13–7), high energy laser beam splitters (see pages 15–14 to 15–15), laser line non-polarizing beam splitters (see pages 20–71 to 20–72), cube beam splitters (see pages 13–9 to 13–13, 14–16, 14–17, and 20–66 to 20–70), and the like. As long as a portion of the laser beam is transmitted while another portion is reflected, the beam splitter may be used.

By way of further illustration, and not limitation, one may use the beam splitters described in U.S. Pat. Nos. 5,078,473, 5,073,879, 5,073,702, 5,071,251, etc. The entire disclosure of these patents is hereby incorporated by reference into this specification.

In one preferred embodiment, beam splitter 14 is a plate beam splitter comprised of glass a portion of which is coated with silver.

Depending upon the distance between each of reflectors 16 and 18 and beam splitter 14, and the reflectivity of each of reflectors 16 and 18, the amount of light transmitted to reflector 18 will be from about 10 to about 90 percent of the total amount of light flux present in beam 22.

Referring again to FIG. 1, it is preferred that each of reflectors 16 and 18 have a reflectivity of from about one percent to about 100 percent and, preferably, have a reflectivity of at least about 20 percent. In one preferred embodiment, the reflectivity of each of reflectors 16 and 18 is at least about 80 percent.

One may use any of the conventional reflectors which are readily commercially available. Thus, e.g., referring to the aforementioned Melles--Griot catalog, one may use flat mirrors (see page 12–11), square flat mirrors (see page 12–12), round flat mirrors (see page 12–13), laser diode mirrors (see page 12–14), spherical concave mirrors (see page 12–15), and the like.

Referring again to FIG. 1, it will be seen that the light reflected from reflector 16 will travel in the direction of arrow 28, and at least a portion of such light will travel along optical path 30 towards optical processor 20. Similarly, light reflected from reflector 18 will travel in the directions of arrows 32 and be reflected by beam splitter 14 along optical path 30 towards optical processor 20.

Figure 1A:
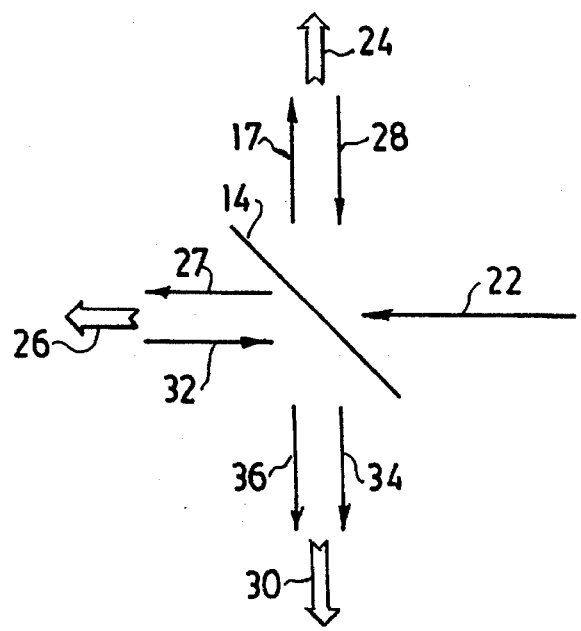
FIG. 1A is a schematic diagram of the optical paths traveled by the light beams in the device of FIG. 1.

FIG. 1A summarizes the light paths used in the device of FIG. 1. The initial light beam 22 is initially split into light beams 24 and 26 which travel along directions 17 and 27 and, after reflection travel back towards beam splitter 14 in the directions of arrows 28 and 32. A portion of the beam traveling along path 28 is transmitted through beam splitter 14 towards optical processor 20 in the direction of arrow 34, and a portion of the beam traveling along path 32 is reflected towards optical processor 20 in the direction of arrow 36.

Referring again to FIG. 1A, when the light beams traveling along light paths 34 and 36 are in phase, the resulting beam is deemed to be "constructive" and has a maximum intensity; see, e.g., pages 131–136 of J. Wilson et al.'s "Lasers: Principles and Applications," Prentice Hall, New York, 1987. However, when the light beams traveling along light paths 34 and 36 are 180 degrees out of phase, there will be a "destructive" composite beam produced, and the light intensity will be at a minimum. When the light beams are between 1 and 179 degrees out of phase, the light intensity will range from the maximum to the minimum.

Referring again to FIG. 1, and in the embodiment illustrated therein, each of reflectors 16 and 18 is disposed at a 90 degree angle with regard to optical paths 24 and 26; and optical processor 20 is also disposed at a 90 degree angle to optical path 30. As will be apparent to those skilled in the art, if either or both of reflectors 16 and/or 18 is tilted so that it is at an angle other than 90 degrees, or if optical processor 20 is tilted so that it is at an angle other than 90, there will be produced a diffuse pattern of light beams along optical path 30 which will show themselves as an interference fringe pattern on the receiving plane 31 of the optical processor 30; see, e.g., page 135 of the aforementioned J. Wilson text. Only when both reflectors 16 and 18 are disposed at exactly 90 degrees, and when receiving plane 31 of optical processor 30 is also disposed at exactly 90 degrees, does the interference fringe pattern appear as one spot.

The elements 12, 14, 16, 18, and 20, and their cooperation to produce interference fringe patterns, are both well known. See, e.g., U.S. Pat. Nos. 5,098,190, 5,076,689, 4,997,272, 4,991,963, and the like. The entire disclosure of each of these patents is hereby incorporated by reference into this specification.

The light beam(s) traveling along path 30 impact the receiving plane 31 of optical processor 20. One preferred embodiment of receiving plane 31 is illustrated in FIG. 2.

Figure 2:
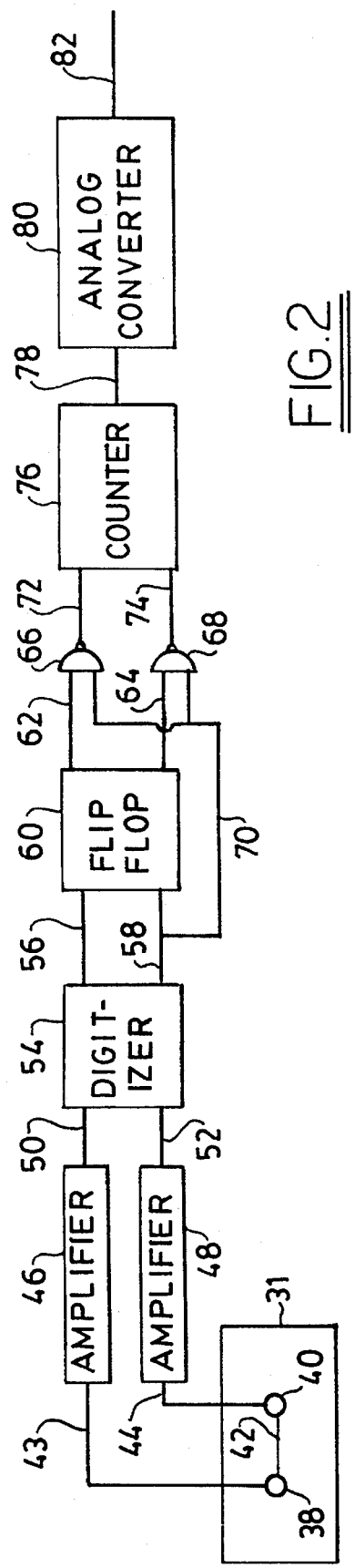
FIG. 2 is a block diagram of the preferred circuitry and logic used in the preferred apparatus of this invention.

Referring to FIG. 2, it will be seen that receiving plane 31 is comprised of a first optical sensor 38 and a second optical sensor 40, each of which is adapted to convert light energy into an electrical signal which will vary in intensity with the phase relationship between the beams traveling along arrows 34 and 36.

The optical sensors 38 and 40 are disposed at a distance 42 from each other of from about 0.5 millimeters to about 5.0 centimeters. It is preferred that distance 42 be from about 1 millimeter to about 10 millimeters. In one embodiment, sensors 38 and 40 are from about 1.5 to about 4 millimeters apart.

One may use conventional optical sensors, especially those which are comprised of one or more semiconductors. Thus, by way of illustration and not limitation, one may use the optical sensors described in U.S. Pat. Nos. 5,097,476, 5,005,085, 5,003,188, 4,996,573, 4,987,461, 4,926,231, and the like. The entire disclosure of each of these patents is hereby incorporated by reference into this specification.

Thus, by way of further illustration, one may use an HFD Series Photodiode/Operational Amplifier sold (as catalog number D3017A-2) by the EG&G Electro-Optics company of 35 Congress Street, Salem, Mass. Thus, e.g., one may use an SD113-2421-021 Bi-Cell which is sold by the Silicon Detector Corporation of 1240 Avenida Acasco, Camarillo, Calif. (see catalog No. 400-44-003, Revision C). The latter sensor, a "bi cell," combines two light sensing diodes separated by a distance of 2 millimeters into one unit. Thus, by way of yet further illustration, one may use an SD-100-4X-XX-231 DETECTOR/PREAMP which is also sold by the Silicon Detector Corporation; see, e.g., catalog number 400-44-002, Revision D.

Referring again to FIGS. 1 and 1A, when mirror 18 is moved, the interference fringe formed on plane 31 of optical processor 20 also moves. As such interference fringe moves, then the intensity level sensed by sensor 38 and/or sensor 40 will vary. This variation in intensity level can be picked up and evaluated by the optical processor 20.

The variation in intensity level will be translated into electrical signals by optical sensors 38 and 40, each of which will pass such signals by separate lines (such as lines 43 and 44) to amplifiers 46 and 48. The amplified signals are then passed via lines 50 and 52 to a digitizer 54.

As will be apparent to those skilled in the art, the digitizer 54 converts each of the electrical inputs fed to it via lines 50 and 52 into a digital signal. In one preferred embodiment, digitizer 54 is a semiconductor device.

One may use any of the digitizers well known to those skilled in the art. Thus, e.g., one may use one or more of the digitizers disclosed in U.S. Pat. Nos. 5,107,079, 5,103,466, 5,103,080, 5,093,843, 5,083,313, 5,081,297, and the like. The entire disclosure of each of these patents is hereby incorporated by reference into this specification.

By way of further illustration, one may use any of the D/A converters disclosed on pages 237–242 of Rudolf F. Graf's "The Encyclopedia of Electronic Circuits," Tab Books Inc., Blue Ridge Summit, Pa. 1985.

In one preferred embodiment, a type 741 amplifier is used as the digitizer.

Referring again to FIG. 2, the digitized outputs from digitizer 54 are passed via lines 56 and 58 to flip flop circuit 60, in which the output of lines 56 and 58 is combined according to specified digital logic table. As is known to those skilled in the art, one output from flip/flop device 60, known as "Q", is provided to line 62. A second output from flip/flop device 60, which is the inverse of "Q" and is called "Q bar", is provided to line 64.

The Q/Q bar outputs from lines 62 and 64 are fed to NAND gates 66 and 68. Furthermore, a portion of the output from line 58 is also fed to line 70 and, thereafter, to NAND gate 66.

The NAND gates 66 combines the two separate signals fed to it and reverses the polarity of such signals; it feeds it output via line 72, which is referred to hereinafter as "up input," to digital counter 76. The output of line 74, which comes from NAND gate 68 and is referred to hereinafter as "down input", also is fed to counter 76.

The counter 76 will provide an output which will simulate the shape of the electrical waves originally generated by sensors 38 and 40, in a digital form. The ascending portion of such waves is provided by the up input; the descending portion of such waves is provided by the down input.

The simulated electrical wave signal will be provided by lines 78 a digital to analog converter 80, which will provide an electrical signal 82 which simulates the analog motion of reflector 18 (see FIG. 1). This electrical signal can be displayed by conventional means, such as an oscilloscope, or other graphics display, to accurately reflect the motion of reflector 18. When reflector 18 is attached to an object to be monitored, such as, e.g., a shaker (not shown) or a vibrating mechanical part (not shown), the motion of such object will be accurately described by such display.

In one embodiment, not shown, reflector 18 is a mirror attached to the object to be monitored. In another embodiment, the reflector 18 is aluminum foil attached to such object. In yet another embodiment, reflector 18 is reflective tape such as that sold by the Minnesota Mining and Manufacturing Corporation of Minnesota.

Figure 3:
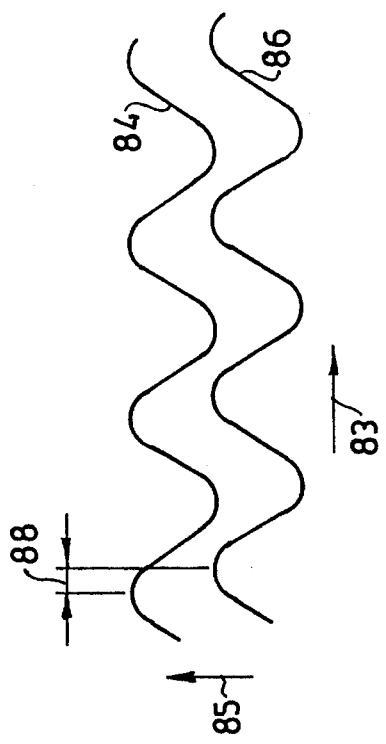
FIG. 3 is a graph illustrating how the outputs from the two optical detectors of the optical processor of FIG. 2 are out of phase with each other in one instance.

FIG. 3 is an illustrative graph of the electrical outputs 84 and 86, on which time is plotted in the direction of arrow 83 and amplitude is plotted in the direction of arrow 85; the wavelengths of these outputs corresponds to the wavelength of laser beam 22; and these outputs are fed from sensors 38 and 40 via lines 43 and 44. Referring to FIG. 3, it will be seen that sine wave output 84 leads sine wave output 86 by a time 88, and, thus, that these two outputs are out of phase. This type of output is typical when the object to be viewed, which is attached to reflector 18, is moving linearly towards the beam splitter 14.

As will be apparent to those skilled in the art, when the object to be viewed is moving away from beam splitter 14, a different, opposite, phase shift will be produced, and output 84 will lag output 86.

Figure 4:
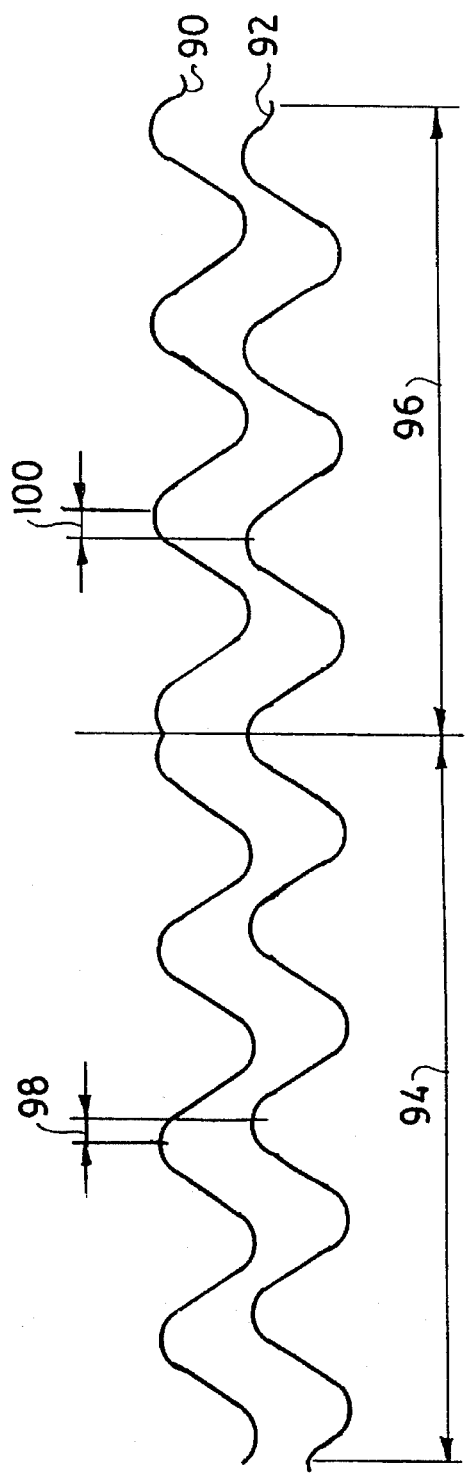
FIG. 4 is a graph illustrating the phase shifts which occur when the object being sensed is moving towards or away from the vibrometer.

FIG. 4 presents an illustrative graph of the electrical output from sensors 38 and 40 when the object to which reflector 18 is oscillating in a back-and-forth motion towards and away from beam splitter 14. Referring to FIG. 4, it will be seen that the electrical output 90 is produced from one of the sensors 38 or 40, and electrical output 92 is being produced by another of such sensors 38 and 40.

During time period 94, the reflector 18 is moving towards beam splitter 14; and, in such a case, signal 90 leads signal 92 by time 98. During time period 96, the reflector 18 is moving away from beam splitter 14; and, in this instance, signal 90 lags signal 92 by time 100.

Figure 5:
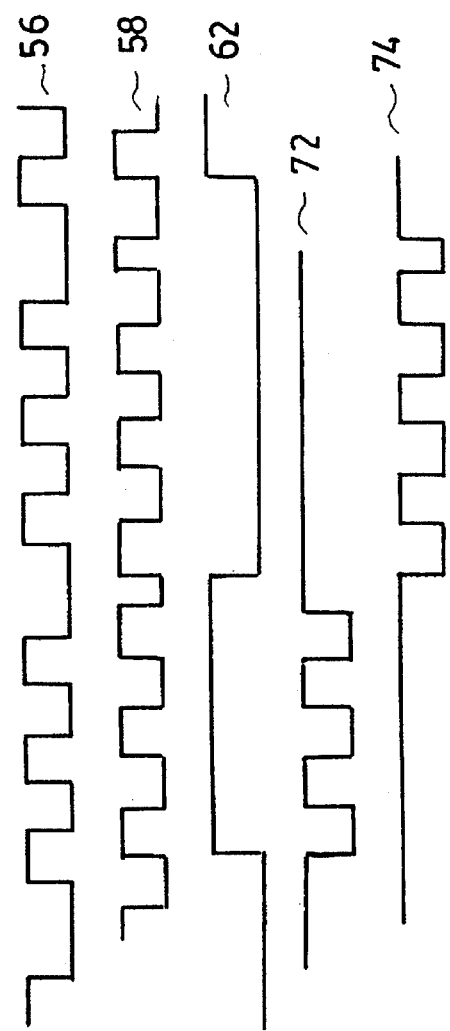
FIG. 5 is a graph of digitized wave forms produced from the data from the optical sensors.

FIG. 5 is a graph of illustrative output 62 (Q) from flip flop device 60 which corresponds to the outputs 90 and 92 of FIG. 4. As is true with FIG. 4, during the time 94, during which the reflector 18 is moving towards the beam splitter 14, the output 62 is leading output 64. In this situation, only when both outputs are positive (1) will the Q be 1. Conversely, during the time 96, during which the reflector 18 is moving away from the beam splitter 14, the output 62 is lagging the output 64; in this situation, Q will always be 0, and Q bar will always be 1.

Referring again to FIG. 2, the Q bar so produced is combined with the output of line 58 and fed to NAND gate 68. The Q so produced is fed directly to NAND gate 66. The outputs from these NAND gates are signals 72 and 74 which, in turn, may be fed to counter 76 (see FIG. 2).

The signal 72 is fed to the up counter. The signal 74 is fed to the down counter. As indicated elsewhere in this specification, the up counter pulses are used to provide the ascending portions corresponding one direction (towards the beam splitter) of the mechanical motion of reflector 18, and the down counter pulses are used to provide the descending portions corresponding to the movement of reflector 18 away from beam splitter 14.

Figure 6B:
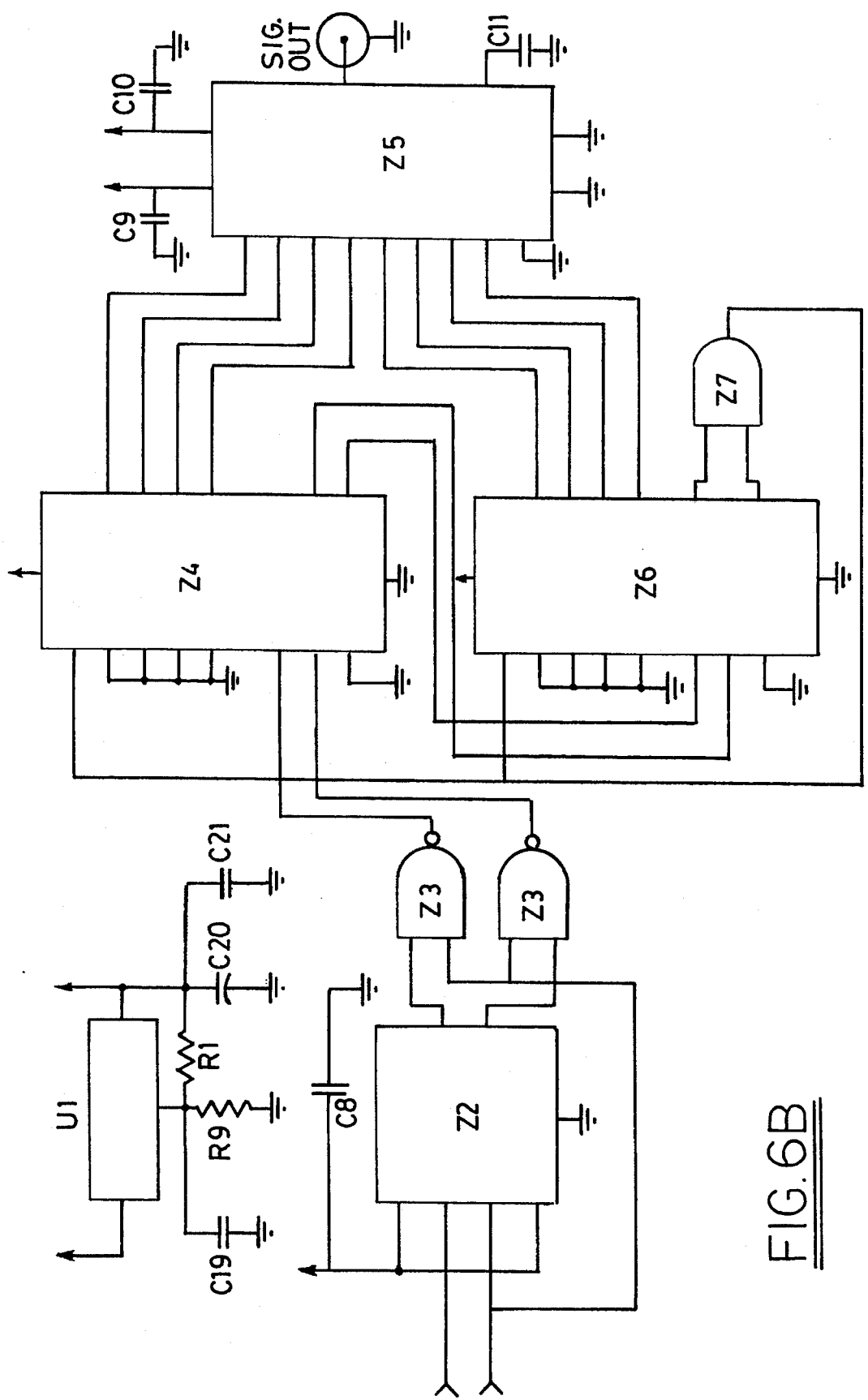

FIG. 6 is a schematic of a preferred laser vibrometer. In the circuit of FIG. 6, all unlabeled capacitors are 1 microfarad, semiconductors QA1 and QA3 are LM5154, semiconductors QA2 and QA4 are LM361, semiconductor chip Z1 is a 7404 chip, semiconductor chip Z2 is a 7474 chip, semicondunductor chip Z3 is a 7400 chip, semiconductor chips Z4 and Z6 are 74193 chips, semiconductor chip Z5 is a TDA8702 chip, semiconductor chip Z7 is a 7408 chip, and all unused inputs in semiconductor chips Z1, Z2, Z3, and Z7 are grounded.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. An laser vibrometer for measuring the rate at which a specified target vibrates comprised of:

(a) means for producing a first laser beam;

(b) a laser beam splitter disposed in front of said means for producing a first laser beam, wherein:
   1. a portion of said first laser beam is transmitted through said laser beam splitter as a second laser beam, and
   2. a portion of said first laser beam is reflected by said laser beam splitter as a third laser beam;

(c) a first reflector comprised of reflective tape attached to said target disposed in the path of said second laser beam and adapted to produce a fourth laser beam reflected back to said laser beam splitter;

(d) a second reflector disposed in the path of said third laser beam and adapted to produce a fifth laser beam reflected back to said laser beam splitter;

(e) an optical processor comprised of a top face, wherein:
   1. said fourth laser beam is reflected by said laser beam splitter as a sixth laser beam directed towards said top face of said optical processor, and
   2. said fifth laser beam is transmitted by said laser beam splitter as a seventh laser beam towards said top face of said optical processor, wherein said sixth laser beam and said seventh laser beam interfere with each other to produce a laser beam interference pattern;
   3. said optical processor is comprised of a bi-cell containing a first optical sensor and a second optical sensor separated from each other by a distance of from 0.5 millimeters to 5.0 centimeters, wherein each of said optical sensors converts said laser beam interference pattern into electrical signals, including a first electrical signal and a second electrical signal, which vary in intensity, whereby said first electrical signal and said second electrical signal are produced by said first sensor and said second sensor, respectively;

(f) means for amplifying each of said first electrical signal and said second electrical signal, thereby producing an amplified first electrical signal and an amplified second electrical signal;

(g) means for digitizing each of said amplified first electrical signal and said amplified second electrical signal, thereby producing a first digitized signal and a second digitized signal;

(h) flip flop means for combining said first digitized signal and said second digitized signal into a Q signal and a Q bar signal;

(i) means for combining said Q signal with said second digitized signal, thereby producing a first input signal;

(j) means for combining said Q bar signal with said second digitized signal, thereby producing a second input signal;

(k) an up counter and a down counter for counting said first input signal and said second input signal and for producing a digital sequence based upon such counting.

2. The laser vibrometer as recited in claim 1, wherein said laser vibrometer is further comprised of a display.

3. The laser vibrometer as recited in claim 1, wherein said means for producing a first laser beam is a helium--neon laser.

4. The laser vibrometer as recited in claim 1, wherein said flip-flop means is comprised of a flip-flop circuit.

5. The laser vibrometer as recited in claim 1, wherein said first optical sensor is silicon semiconductor.

6. The laser vibrometer as recited in claim 5, wherein said second optical sensor is a silicon semiconductor.

7. The laser vibrometer as recited in claim 1, said means for digitizing is comprised of a first digitizer and a second digitizer.

8. The laser vibrometer as recited in claim 7, wherein each of said first digitizer and said second digitizer is an operational amplifier.

9. The laser vibrometer as recited in claim 8, wherein said operational amplifier converts analog signals to digital signals.

* * * * *